(12) United States Patent
Kumar et al.

(10) Patent No.: US 11,037,022 B2
(45) Date of Patent: Jun. 15, 2021

(54) DISCOVERY OF SHIFTING PATTERNS IN SEQUENCE CLASSIFICATION

(71) Applicant: Regents of the University of Minnesota, Minneapolis, MN (US)

(72) Inventors: Vipin Kumar, Minneapolis, MN (US); Xiaowei Jia, Minneapolis, MN (US); Ankush Khandelwal, Minneapolis, MN (US); Anuj Karpatne, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 84 days.

(21) Appl. No.: 16/371,274

(22) Filed: Apr. 1, 2019

(65) Prior Publication Data

US 2019/0303713 A1    Oct. 3, 2019

Related U.S. Application Data

(60) Provisional application No. 62/650,819, filed on Mar. 30, 2018.

(51) Int. Cl.
*G06K 9/62* (2006.01)
*G06K 9/00* (2006.01)
*G06N 3/04* (2006.01)

(52) U.S. Cl.
CPC ....... *G06K 9/6226* (2013.01); *G06K 9/00557* (2013.01); *G06K 9/00657* (2013.01); *G06K 9/00885* (2013.01); *G06N 3/049* (2013.01); *G06K 2009/00939* (2013.01)

(58) Field of Classification Search
CPC ............ G06K 9/6226; G06K 9/00557; G06K 9/00885; G06K 9/00657; G06K 2009/00939; G06K 9/6273; G06N 3/049; G06N 20/20; G06N 5/003; G06N 7/005; G06N 20/10; G06N 3/084; G06N 3/0445; G06N 3/0454
See application file for complete search history.

(56) References Cited

U.S. PATENT DOCUMENTS

2015/0278603 A1* 10/2015 Boriah ................ G06K 9/0063
382/103

OTHER PUBLICATIONS

Sanchez-Rodriguez et al., "A Low Complexity System Based on Multiple Weighted Decision Trees for Indoor Localization", Sensors 2015, 15, 14809-14829 (Year: 2015).*

(Continued)

*Primary Examiner* — Qian Yang
(74) *Attorney, Agent, or Firm* — Theodore M. Magee; Westman, Champlin & Koehler, P.A.

(57) ABSTRACT

A method includes receiving data for an entity for each of a plurality of time points. For each of a plurality of time windows that each comprises a respective plurality of time points, a confidence value is determined. The confidence value provides an indication of the degree to which the time window contains data that is useful in discriminating between classes. The confidence values are used to determine a probability of a class and the probability of the class is used to set a predicted class for the entity.

7 Claims, 7 Drawing Sheets

(56) References Cited

OTHER PUBLICATIONS

Rubwurm et al., "Temporal Vegetation Modelling using Long Short-Term Memory Networks for Crop Identification from Medium-Resolution Multi-Spectral Satellite Images", Proceedings of the IEEE Conference on Computer Vision and Pattern Recognition (CVPR) Workshops, 2017, pp. 11-19 (Year: 2017).*
Adamo, Data mining for association rules and sequential patterns: sequential and parallel algorithms. Springer Science & Business Media, 10 pages, 2012.
Altun et al., "Hidden markov support vector machines," in ICML, 8 pages, 2003.
Batal et al., "Mining recent temporal patterns for event detection in multivariate time series data," in SIGKDD, ACM, 31 pages, 2012.
Bengio, et al. Learning long-term dependencies with gradient descent is difficult, IEEE transactions on neural networks, 35 pages, 1994.
Caragea et al., "Protein sequence classification using feature hashing," Proteome science, 8 pages, 2012.
Carlson et al., Carbon emissions from forest conversion by Kalimantan oil palm plantations, Nature Climate Change, pp. 283-287, 2013.
Chen et al., "A general framework to increase the robustness of model-based change point detection algorithms to outliers and noise," in SDM, pp. 162-170, 2016.
Cheng et al., "Discriminative frequent pattern analysis for effective classification," in ICDE, 10 pages, 2007.
Chung et al., "Empirical evaluation of gated recurrent neural networks on sequence modeling," arXiv preprint arXiv:1412.3555, 9 pages, 2014.
Dietterich et al., "Machine learning for sequential data: A review," in Joint IAPR International Workshops on SPR and SSPR. Springer, 15 pages, 2002.
Fan et al., Phenology-based vegetation index differencing for mapping of rubber plantations using Landsat oli data, Remote Sensing, vol. 7, pp. 6041-6058, 2015.
Fu et al., Transductive multi-view embedding for zero-shot recognition and annotation, In ECCV, 16 pages, 2014.
Goldberger et al., Neighbourhood components analysis, In NIPS, 8 pages, 2004.
Graves et al., A novel connectionist system for unconstrained handwriting recognition, PAMI, 14 pages, 2009.
Graves et al., "Speech recognition with deep recurrent neural networks," in ICASSP. IEEE, 5 pages, 2013.
Grimm et al., Global change and the ecology of cities. Science, vol. 319, pp. 756-760, 2008.
Gunarso et al., Roundtable on sustainable palm oil, Kuala lumpur, Malaysia, Reports from the technical panels of the 2nd greenhouse gas working group of RSPO, 196 pages, 2013.
Hansen et al., High-resolution global maps of 21st-century forest cover change, Science, vol. 342, pp. 850-853, 2013.
Homer et al., Development of a 2001 national land-cover database for the united states, Photogrammetric Engineering & Remote Sensing, vol. 70, No. 7, pp. 829-840, 2004.
Hu et al., "Action detection in complex scenes with spatial and temporal ambiguities," in Computer Vision, 2009 IEEE 12th International Conference on. IEEE, pp. 128-135, 2009.
Jia et al., Collaborative restricted Boltzmann machine for social event recommendation, In ASONAM, pp. 402-405, 2016.
Jia et al., Learning large-scale plantation mapping from imperfect annotators, In IEEE BigData, p. 1192-1201, 2016.
Jianya et al., "A review of multi-temporal remote sensing data change detection algorithms," ISPRS, pp. 757-762, 2008.
Jolliffe, Principal component analysis. Wiley Online Library, 2002.
Karpatne et al., Monitoring land-cover changes: A machine-learning perspective, IEEE Geoscience and Remote Sensing Magazine, pp. 8-21, 2016.
Koelstra et al., "DEAP: A database for emotion analysis; using physiological signals," TAC, 15 pages, 2012.
Lee et al., "Mining discriminative patterns for classifying trajectories on road networks," IEEE Transactions on Knowledge and Data Engineering vol. 23, No. 5, pp. 713-726, 2011.
Li et al., DRN: Bringing greedy layer-wise training into time dimension, IEEE International Conference on Data Mining, pp. 859-864, 2015.
Li et al., "Improving EEG feature learning via synchronized facial video," in IEEE Big Data. IEEE, pp. 843-848, 2015.
Liu et al., "Unified point-of-interest recommendation with temporal interval assessment," in SIGKDD. ACM, 10 pages, 2016.
Losing et al., KNN Classifier with Self Adjusting Memory for Heterogeneous Concept Drift, In ICDM, 10 pages, 2016.
Lyu et al., Learning a transferable change rule from a recurrent neural network for land cover change detection, Remote Sensing, vol. 8, No. 506, 22 pages, 2016.
Miettinen et al., 2010 land cover map of insular southeast Asia in 250-m spatial resolution, Remote Sensing Letters, vol. 3, No. 1, pp. 11-20, 2012.
Mikolov et al., Efficient estimation of word representations in vector space. arXiv preprint arXiv:1301.3781, 12 pages, 2013.
Min et al., Player goal recognition in open-world digital games with long short-term memory networks, 2016.
Ng et al., Beyond short snippets: Deep networks for video classification, In CVPR, 9 pages, 2015.
Norouzi et al., Stacks of convolutional restricted Boltzmann machines for shift-invariant feature learning, In CVPR, pp. 2735-2742, 2009.
Palatucci et al., Zero-shot learning with semantic output codes, In Advances in neural information processing systems, 9 pages, 2009.
Petersen et al., Mapping tree plantations with multispectral imagery: preliminary results for seven tropical countries, World Resources Institute, Technical Note, 18 pages, 2016.
Pielke, Land use and climate change, In Science, vol. 310, pp. 1625-1626, 2005.
Rabiner et al., "A tutorial on hidden markov models and selected applications in speech recognition," Proceedings of the IEEE, pp. 257-286, 1989.
Sauter et al., Spatio-temporal prediction of snow cover in the black forest mountain range using remote sensing and a recurrent neural network, International Journal of Climatology, vol. 30, pp. 2330-2341, 2010.
Shalaby et al., Remote sensing and gis for mapping and monitoring land cover and land-use changes in the northwestern coastal zone of Egypt, Applied Geography, vol. 27, pp. 28-41, 2007.
Simonyan et al., "Deep inside convolutional networks: Visualising image classification models and saliency maps," arXiv preprint arXiv:1312.6034, 8 pages, 2013.
Socher et al., Zero-shot learning through cross-modal transfer, In Advances in neural information processing systems, 10 pages, 2013.
Sundermeyer et al., LSTM Neural Networks for Language Modeling, In Interspeech, 4 pages, 2012.
Sutskever et al., "The recurrent temporal restricted Boltzmann machine," in NIPS, 8 pages, 2009.
Sutskever, Training recurrent neural networks. PhD thesis, University of Toronto, 101 pages, 2013.
USDA National Agricultural Statistics Service Cropland Data Layer, https://nassgeodata.gmu.edu/cropscape, accessed Apr. 5, 2019.
Verbesselt et al., Detecting trend and seasonal changes in satellite image time series, Remote Sensing of Environment, 28 pages, 2010.
Wang et al. "Harmony: Efficiently mining the best rules for classification," in SDM, 12 pages, 2005.
Wu et al., Monitoring and predicting land use change in Beijing using remote sensing and GIS, Science Direct, Landscape and urban planning, vol. 78, pp. 322-333, 2006.
Xu et al., "Ensemble multi-instance multi-label learning approach for video annotation task," in ACMMM, 5 pages, 2011.
Xun et al., A survey on context learning, IEEE Transactions on Knowledge and Data Engineering, vol. 29, No. 1, pp. 38-56, 2017.
Yuan et al., Discriminative video pattern search for efficient action detection, IEEE Transactions on Pattern Analysis and Machine Intelligence, vol. 33, pp. 1728-1743, 2011.

(56) References Cited

OTHER PUBLICATIONS

Zhou et al., Pattern based sequence classification, IEEE Transactions on Knowledge and Data Engineering, vol. 28, No. 5, pp. 1285-1298, 2016.

* cited by examiner

DISCOVERY OF SHIFTING PATTERNS IN SEQUENCE CLASSIFICATION

CROSS-REFERENCE OF RELATED APPLICATION

The present application is based on and claims the benefit of U.S. provisional patent application Ser. No. 62/650,819, filed Mar. 30, 2018, the content of which is hereby incorporated by reference in its entirety.

This invention was made with government support under IIS-1029711 awarded by the National Science Foundation. The government has certain rights in the invention.

BACKGROUND

While sorting items into classes based on received information about the items seems like an easy task, it is often very difficult to do correctly when different classes of items have similar information or when the information for all classes contains a great deal of noise. Human experts and automatic classification systems both generate a number of classification errors when these conditions are true. Further, when the information about the items is changing over time, it is difficult for human experts and automatic classification system to identify which part of the information stream should be used to perform the classification task.

The discussion above is merely provided for general background information and is not intended to be used as an aid in determining the scope of the claimed subject matter. The claimed subject matter is not limited to implementations that solve any or all disadvantages noted in the background.

SUMMARY

A method includes receiving satellite image data for a location for each of a plurality of time points. For each of a plurality of time windows that each comprises a respective plurality of time points, a confidence value is determined. The confidence value provides an indication of the degree to which the time window contains image data that is useful in discriminating between land cover types. The confidence values are used to determine a probability of a land cover type and the probability is used to set a predicted land cover type for the location.

In accordance with a further embodiment, a method includes receiving an electrical signal from an electrical lead on a person's body for each of a plurality of time points. For each of a plurality of time windows that each comprises a respective plurality of time points, a confidence value is determined. The confidence value provides an indication of the degree to which the time window contains an electrical signal that is useful in discriminating between states of the person. The confidence values are used to determine a probability of a state of the person and the probability of a state of the person is used to set a predicted state of the person.

In a still further embodiment, a method includes receiving data for an entity for each of a plurality of time points. For each of a plurality of time windows that each comprises a respective plurality of time points, a confidence value is determined. The confidence value provides an indication of the degree to which the time window contains data that is useful in discriminating between classes. The confidence values are used to determine a probability of a class and the probability of the class is used to set a predicted class for the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

1 Introduction

The last decade has witnessed the rapid development of Internet and sensor equipment, which produce large volume of sequential data. The collected sequential data usually contain descriptive information from multiple aspects, which form multi-variate data streams. For instance, the optical satellite sensors can capture reflectance values for multiple bandwidths, which are indicative of different environmental variables, such as vegetation, aerosols, water index, etc. The classification of these sequential data is of great importance in many applications. For example, the cropland mapping using multi-spectral remote sensing data can offer timely agricultural information, which is critical to meet the increasing demand for food supply and food security.

Figure 1:
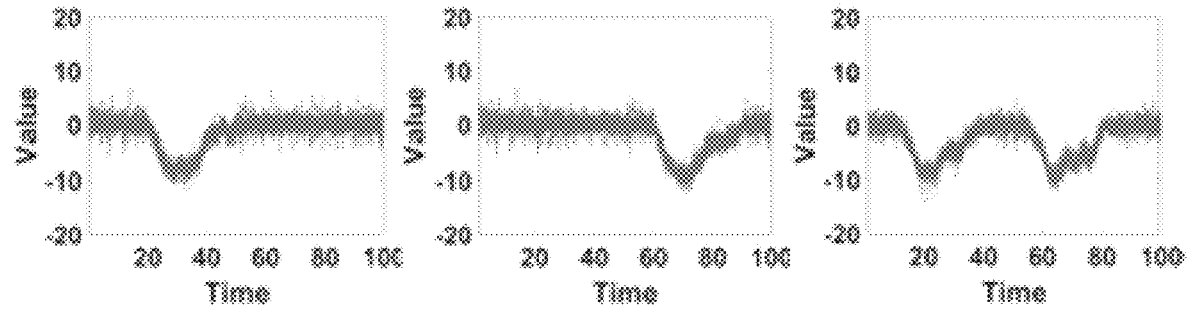
FIGS. 1(a)-1(c) show image values for three different locations over time for a same land cover type (burned area) with shifting temporal patterns.

Many sequential datasets are collected over long span of time and contain much irrelevant information to the classification task. When classifying multi-variate sequential data, each class is usually reflected by certain discriminative patterns within the sequence. Even for sequences within the same class, the discriminative patterns can appear in different time periods. Due to such property, we call these discriminative periods as shifting patterns. Consider the three example sequences of the same class in FIG. 1. FIGS. 1(a)-(c) show graphs of spectral values over a sequence of time steps for three different locations that all belong to a same land cover type or class. Each of graphs shows a similar change in the spectral values over time but the changes occur at different time points. For example, FIG. 1(a) shows a dip at time point 30, FIG. 1(b) shows a similar dip at time point 70, and FIG. 1(c) shows two dips, one at time point 20 and one at time point 60. Thus, similar patterns can occur in different periods and even with different numbers of occurrences. Therefore, the effective classification requires the automatic detection of the most informative period from the entire sequence.

Shifting patterns are ubiquitous in real-world applications. In cropland mapping, domain experts commonly use the growing season to characterize specific crop types. However, the planting and harvest time can vary across regions and across years according to climate conditions. Similarly, when electroencephalogram (EEG) data are collected for affective state recognition, the emotion signature is only reflected in short time periods and these informative periods also change across users. Similarly, when using EEG to detect seizures, seizures will strike at different times in different users. Given multi-variate sequential data collected in these applications, the discriminative patterns are often more complicated than the patterns in univariate sequences (e.g. FIG. 1) and the data also contain much noise. Hence, the shifting patterns cannot be easily recognized using simple time series-based methods.

Most traditional sequence classification approaches directly take the input of entire sequence and treat each time step equally without the awareness of the informative period. Hence their performance is highly likely to be negatively impacted by the irrelevant time periods in sequential data. Also, the ignorance of the shifting pattern property can result in strong heterogeneity/multimodality in the training set. Consequently, the heterogeneity will lead to poor learning performance without sufficient labeled data on all the modes. In contrast, the successful discovery of shifting patterns can not only improve the classification performance, but also promote the interpretability of classification. In addition, the successful detection of informative period in streaming data can potentially contribute to an early-stage prediction before collecting the entire sequence.

In the various embodiments, a sequence classification method, which integrates a multi-instance learning (MIL) approach, is used to detect discriminative patterns within multi-variate sequences. In particular, a sliding time window is used to capture different time periods over the sequence, which is further combined with a Long Short-Term Memory (LSTM) to model temporal dependencies in sequential data. LSTM has shown tremendous success in memorizing temporal dependencies in long-term events, which commonly exist in climate changes, healthcare, etc. By incorporating temporal relationships in sequential data, LSTM assists in better uncovering discriminative patterns within each time window. For example, crops in their mature phase are similar to certain tree plantations, but we can better distinguish between them by combining the growing history at previous time steps. Besides, the modeling of temporal dependencies assists in mitigating the impact of noise and outliers.

Combining the information from both a current time period and past time periods, each time window generates a latent output indicating the detection confidence of discriminative patterns. After gathering the latent outputs from all the time windows, we utilize an MIL approach to predict a final sequence label. Compared with a traditional supervised approach, the various embodiments learn a mapping from a bag of instances (i.e. time windows) to a label on the whole bag (i.e. sequence). In addition, the LSTM-based sequential structure in the embodiments models the temporal relationships among instances in the bag. In this way, each instance interacts with other instances in the sequential order and contributes to their latent outputs. In accordance with one embodiment, context information for clusters of locations is used to improve the performance of the MIL approach.

We extensively evaluated the proposed method in two real-world applications—cropland mapping using remote sensing data and affective state recognition using EEG data. Cropland mapping is challenging for agricultural domain researchers because different crop types look similar in most dates and are only distinguishable in certain periods of a year. In the second task, affective states are reflected by short neural activities and the classification becomes even more difficult without large volumes of labeled sequences. The experimental results confirm that our proposed method outperforms multiple baselines in both tasks. In addition, we demonstrate that the proposed method can successfully detect shifting patterns and provide reasonably good performance in early-stage prediction.

2 Problem Definition

In this work, a classification model is trained and then is used to identify a predicted class for a set of data points such as a set of geographical locations or electrical leads attached to a person based on a temporal sequence of multi-variate features.

During training of the classification model we are given a set of N data points, $Z=\{z_1, z_2, \ldots, z_N\}$. Each sample $z_i$ is a sequence of multi-variate features at T time steps, $z_i=\{z_i^1, \ldots, z_i^T\}$, where $z_i^t \in \mathbb{R}^D$. Also, we are provided with the labels of these sequential data, $Y=\{y_1, y_2, \ldots, y_N\}$. In method discussion, we omit the sample index i when we focus on a single data point and cause no ambiguity.

Our objective is to train a classification model using the provided sequential data and labels. The learned model can then be applied to predict the label for any test temporal sequences. For instance, in croplands mapping, we train the model using the labels for certain regions in a specific year. Then we utilize the learned model to detect target crop types in other regions or in other years. In addition, we aim to locate the most discriminative time period for each sequence sample.

3 Method

3.1 Sequential Classification Model

Sequential data in real applications are often collected over a long span of time, and therefore cover many time periods irrelevant to the classification task. While the class information can be reflected by discriminative shifting patterns, in practice we are usually not aware of the informative time periods in advance.

In the various embodiments, discriminative shifting patterns are identified from sequential data and subsequently leveraged for classification. Specifically, to detect discriminative patterns that may appear at any position in a given sequence, a sliding time window with length w is used. The basic intuition is to move this sliding window along the sequence and utilize the sliding window to capture the informative time periods that reflect the discriminative patterns. It is noteworthy that the length of the sliding window w depends on specific applications. For instance, in EEG monitoring, w depends on the time span of neural activities (more details will be provided in Section 4). In addition, the step size (i.e. stride) of sliding a window can be selected based on a trade-off between computational costs and accuracy in isolating the discriminative patterns.

Figure 2:
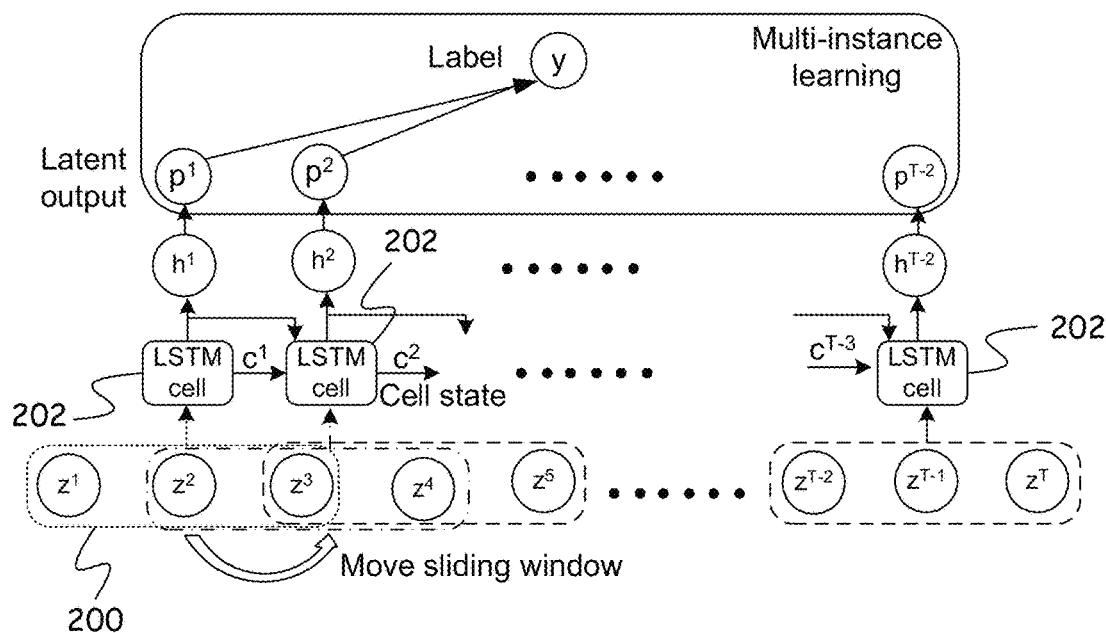
FIG. 2 is a proposed sequential classification method: the raw features in each sliding time window is fed into a LSTM structure, and the outputs from the LSTM structure are aggregated by an MIL approach.

While moving the sliding window along the sequence, we generate a latent output $p^t$ for each time window $[t, t+w-1]$. Here $p^t$ represents the detection confidence of discriminative patterns for K different classes in this time window. Besides, we model the temporal dependencies between different time windows using Long Short-Term Memory (LSTM), as shown in FIG. 2. We utilize LSTM mainly because of its capacity to memorize long-term events, which are very common in real-world scenarios, including climate changes, emotion monitoring, seizures, disease propagation, etc.

In this way, the embodiments capture the local patterns within each time window by learning the mapping from the time window to a hidden representation (through LSTM cell) while utilizing LSTM to model the global temporal patterns over a long period. Then the embodiments aggregate latent outputs from all the time windows to generate final predicted classification result y for the sequence via an MIL method. The MIL structure enables modeling the contribution of each time window to the final decision making.

In this section, we first introduce the proposed LSTM-based sequential model. After that we provide details on the MIL method to combine multiple latent outputs. Finally we discuss how to integrate context information to further improve the classification.

3.1.1 LSTM-Based Sequential Model

For each time window with a length w that starts from time t, we represent the raw input features within the time window as $x^t = \{z^t, z^{t+1}, \ldots, z^{t+w-1}\}$. For example, window 200 of FIG. 2, which has a length w of three and starts at t=1, contains raw input features $z^1$, $z^2$ and $z^3$. Hereinafter we utilize the starting time step t as the index of a time window. As each time window t contains multi-variate features at several consecutive time steps, we wish to extract more representative local patterns from each time window $x^t$, thus to facilitate distinguishing between different classes. Therefore, we introduce the hidden representation $h^t$. As observed from FIG. 2, $h^t$ is generated via an LSTM cell 202 using both the raw features $x^t$ within the current time window and the information from previous time window. Then the latent output $p^t$ is generated from $h^t$.

The discriminative patterns of each class usually follow a specific temporal evolutional process. For example, during a certain period, the sequential data may gradually show a stronger signal of a discriminative pattern, and then the signal strength gradually decreases. The LSTM structure in FIG. 2 is capable of modeling the temporal evolution, which improves the classification performance and also assists in alleviating the impact of noise at any individual time steps.

Figure 3:
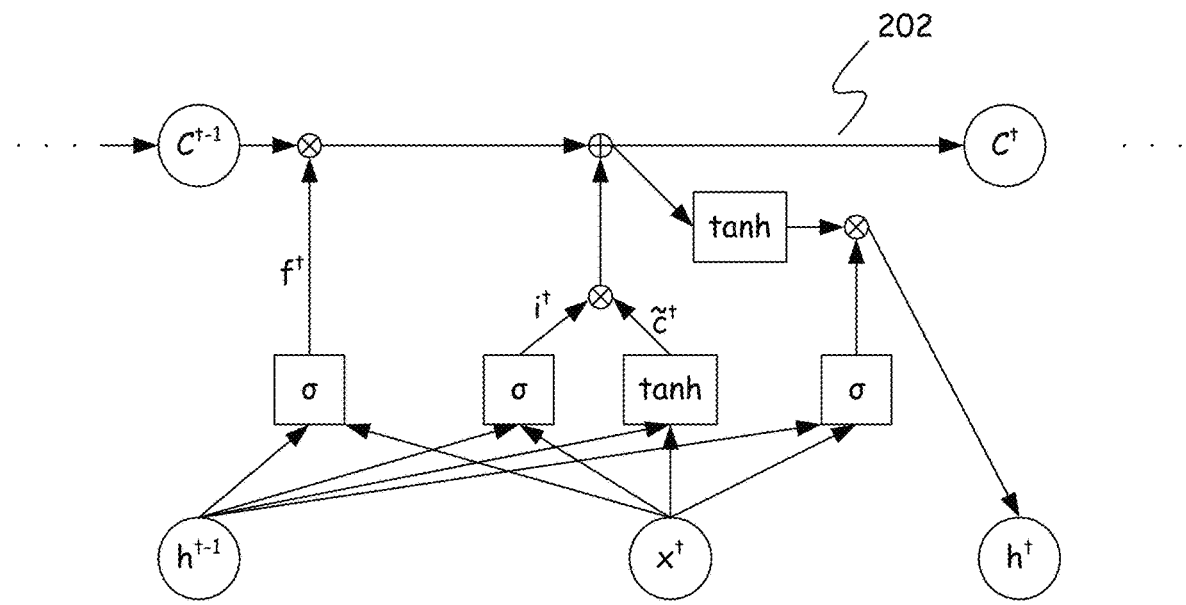
FIG. 3 is a structure of an LSTM cell in accordance with one embodiment.

We now briefly introduce the LSTM cell 202, as shown in FIG. 3. Each LSTM cell contains a cell state $c^t$, which serves as a memory and allows the hidden units $h^t$ to reserve information from the past. The cell state $c^t$ is generated by combining $c^{t-1}$ and the information at t. Hence the transition of cell state over time forms a memory flow, which enables the modeling of long-term dependencies. Specifically, we first generate a new candidate cell state $\tilde{c}^t$ by combining $x^t$ and $h^{t-1}$ into a tan h(•) function, as:

$$\tilde{c}^t = \tan h(W_h^c h^{t-1} + W_x^c x^t) \quad (3.1)$$

where $W_h^c \in \mathbb{R}^{H \times H}$ and $W_x^c \in \mathbb{R}^{H \times D_w}$ denote the weight parameters used to generate candidate cell state. Hereinafter we omit the bias terms as they can be absorbed into weight matrices. Then a forget gate layer $f^t$ and an input gate layer $g^t$ are generated using sigmoid functions, as follows:

$$f^t = \sigma(W_h^f h^{t-1} + W_x^f x^t),$$

$$g^t = \sigma(W_h^g h^{t-1} + W_x^g x^t), \quad (3.2)$$

where $\{W_h^f, W_x^f\}$ and $\{W_h^g, W_x^g\}$ denote two sets of weight parameters for generating forget gate layer $f^t$ and input gate layer $g^t$, respectively. The forget gate layer is used to filter the information inherited from $c^{t-1}$, and the input gate layer is used to filter the candidate cell state at time t. In this way we obtain the new cell state $c^t$ as follows:

$$c^t = f^t \otimes c^{t-1} + g^t \otimes \tilde{c}^t, \quad (3.3)$$

where $\otimes$ denotes entry-wise product.

Finally, we generate the hidden representation at t by filtering the obtain cell state using an output gate layer $o^t$, as:

$$o^t = o(W_h^o h^{t-1} + W_x^o x^t),$$

$$h^t = o^t \otimes \tan h(c^t) \quad (3.4)$$

where $W_h^o \in \mathbb{R}^{H \times H}$ and $W_x^o \in \mathbb{R}^{H \times D_w}$ are the weight parameters used to generate the hidden gate layer.

With the hidden representation $h^t$, we produce the latent output of each time window t using a sigmoid function with parameter $U \in \mathbb{R}^{H \times H}$, as follows:

$$p^t = \sigma(U h^t). \quad (3.5)$$

The parameters in the LSTM model can be estimated by the back-propagation (BP) algorithm.

3.1.2 Multi-Instance Aggregation Layer

Having obtained the latent outputs, we introduce an MIL approach, which aims to establish a mapping from multiple time windows to the label of an entire sequence. Specifically, the MIL structure aggregates the latent outputs obtained from sliding time windows, $\{p^1, p^2, \ldots p^{T-w+1}\}$. Since this series of latent outputs indicates the temporal evolution of discriminative knowledge as the sliding window moves along the sequence, we call this series as the temporal profile.

Figure 4:
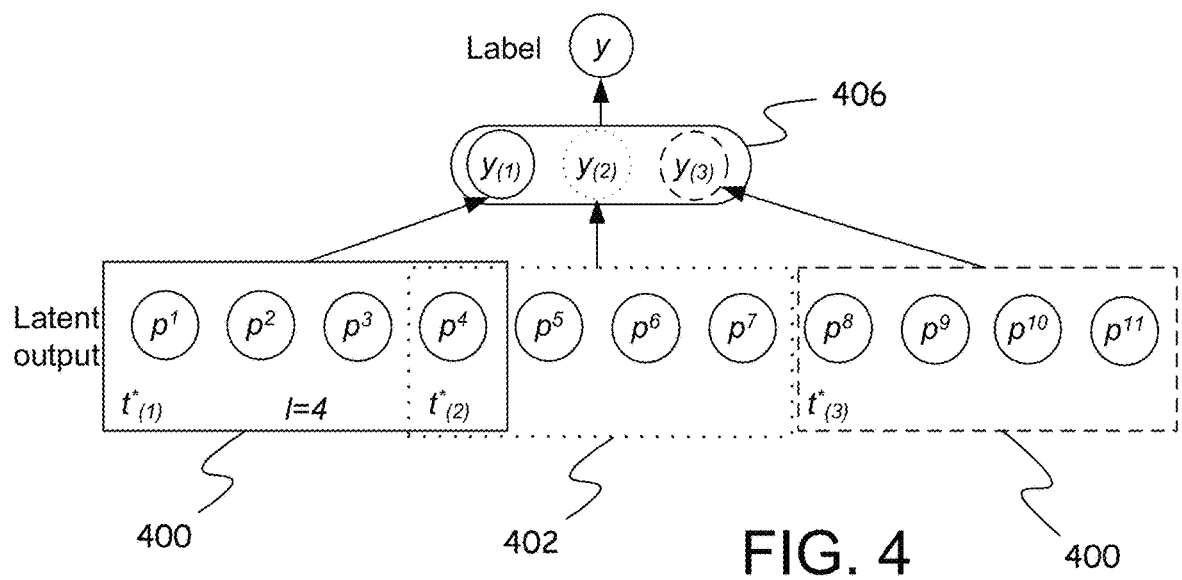
FIG. 4 is the MIL approach to aggregate $p^t$ from multiple time windows. In this example, $l_k=4$ for k=1 to 3. The discriminative patterns of class k persist for $l_k$ consecutive time windows/latent outputs, shown by the boxes in solid, dotted and dashed lines, respectively.

According to the property of shifting patterns, if there exists one time window that shows strong discriminative pattern of a specific class, then the sequence should belong to this class. However, the ubiquitous noise in sequential data frequently leads to misclassification, which likely disturbs the latent outputs from time windows. To address this issue, several embodiments assume that the discriminative pattern should persist for several consecutive time windows, as shown in FIG. 4. Such assumption conforms to most real scenarios, and also mitigates the impact of noise and outliers at individual time steps.

For each class k∈[1, K], instead of selecting the time window with largest $p^t$ value, we take the maximum of the average $p^t$ value over consecutive $l_k$ time windows:

$$y(k) = \max_t \ avg(p_{(k)}^t, p_{(k)}^{t+1}, \cdots p_{(k)}^{t+l_k-1}), k = 1, \cdots, K,$$

where $p_{(k)}^t$ denotes the $k^{th}$ entry of $p^t$ and avg( ) represents the average value of multiple $p_{(k)}^t$ for different time t. We can observe that the larger y(k) requires the higher average value of $p_{(k)}^t$ for consecutive $l_k$ time windows.

The we adopt a soft-max function to generate posterior probability for each class k:

$$P(\hat{y} = k \mid x) = \frac{\exp(y(k))}{\sum_{k'} \exp(y(k'))}, \quad (3.7)$$

where we utilize ŷ to distinguish between the predicted label and the provided label y.

Note that we set $l_k$ separately for each class k since different classes can have different length of discriminative periods, e.g. long-season crops vs. short-season crops. In this work, we propose a self-adaptive method to adjust the value of $l_k$ for each class k. During each up-date iteration in BP, we can obtain $p_k^{t=1:T-w+1}$ through the feed-forward process. We utilize $P_k$ to represent the distribution of $p_k$ values across all the time windows from 1 to T−w+1 and over all the training samples in class k. Then we compute the average $p_k^{t=1:T-w+1}$ over all the samples in class k, denoted by $\varphi_k^{t=1:T-w+1}$. For each class k, we select $l_k$ to be sufficiently long to cover the consecutive time windows with stronger discriminative signals than the remaining periods. In our tests, we set $l_k$ to be the maximum number of consecutive time windows, s.t. ∃t', for t=t' to t'+$l_k$−1, $\varphi_k^t$ is larger than 80 percentile of $P_k$.

In the example of FIG. 4, three classes: 1, 2 and 3, are depicted with each class having a same $l_k$ value of four. Box 400 represents the four consecutive time windows that provide the largest average confidence value for class 1, box 402 represents the four consecutive time windows that provide the largest average confidence value for class 2, and box 404 represents the four consecutive time windows that provide the largest average confidence value for class 3. Row 406 indicates the step of selecting the label for the input values based on which of boxes 400, 402 and 404 provides the highest posterior probability as computed in equation 3.7.

3.1.3 Context Filtering

One limitation of the aforementioned MIL approach lies in its vulnerability to temporally auto-correlated noise. For instance, the collected sequential data may contain much noise in a long period because of data acquisition errors. In this case, the noise affects the latent outputs for several consecutive time windows, likely resulting in misleading outcomes by Eqs. 3.6 and 3.7.

To tackle this problem, several embodiments further incorporate the context information, which is commonly available in real-world applications. The context information describes a clustering structure of training samples, which can be determined by geo-spatial information, data source properties, etc. The samples in the same cluster usually share similar temporal profiles. Considering croplands in the same region, farmers are prone to planting and harvesting each crop type in close dates because of climate conditions. In EEG monitoring, the collected EEG sequences from users with the same experience, e.g. watching the same videos, are likely to share similar temporal profiles. By incorporating the context information in training process, we wish to collaboratively fix the latent outputs disturbed by temporally auto-correlated noise. In this work, we assume that the context information is available in applications or already provided by domain researchers.

Assuming there are in total M different contexts (i.e. M clusters of samples), the embodiments define a mapping C(i) from each sequence index i to its context index in [1, M]. Then based on the proposed sequential model, the context knowledge is used as a regularization term in the cost function. Considering a sequence i, for each class k, we aim to regularize the temporal profile $p_{i,(k)}$ to stay close to the average temporal profiles $\bar{p}_{c(i),(k)}$ over all the samples in class k and in the same context C(i). More formally, the entire cost function can be expressed as follows:

$$\mathcal{J} = \sum_i \sum_k \left\{ -\mathbb{I}(y_i = k)\log p(\hat{y}_i = k \mid x) + \lambda \sum_t (p_{i,(k)}^t - \bar{p}_{c(i),(k)}^t)^2 \right\} \quad (3.8)$$

where I(•) denotes the indicator function, and λ is the weight of the regularizer. The first term on the right side represents the entropy-based cost for soft-max function, and the second term is adopted to regularize samples in the same context to share similar temporal profiles.

We compute the gradient with respect to $p_{(k)}^t$ as follows. Again we omit the sequence index i and context index C(i) for simplicity.

$$\frac{\partial \mathcal{J}}{\partial p_{(k)}^t} = \quad (3.9)$$

$$\begin{cases} p(\hat{y} = k \mid x) - \mathbb{I}(y = k) + 2\lambda(p_{(k)}^t - \bar{p}_{(k)}^t), & t \in [t_k^*, t_k^* + l_k - 1] \\ 2\lambda(p_{(k)}^t - \bar{p}_{(k)}^t), & \text{otherwise,} \end{cases}$$

where $t_k^* = \underset{t}{\operatorname{argmax}} \ \operatorname{avg} \ (p_{(k)}^t, p_{(k)}^{t+1}, \cdots, p_{(k)}^{t+l_k-1})$.

The gradient of $p_{(k)}^t$ w.r.t. model parameters can be estimated by the Back-Propogation algorithm. The complete learning process is summarized in Algorithm 1. The time complexity is O(NTKd), where the number of classes K is a constant factor in most cases, d is a constant factor determined by the dimension of input features, hidden representation and number of different contexts. We name the proposed method as Shifting Pattern Analysis from Multi-variate Sequences (SPAMS).

In practice, it is preferable to predict a class for the incoming data streams early. For instance, the government would like to identify local crop types at the growing season rather than at the end of each year. Using the proposed method, the embodiments can obtain the latent output/ detection confidence of each time window t, which can be treated as the classification result of the corresponding time period [t, t+w−1]. If short delay is allowed, e.g. predicting for time window [t−w+1, t] at time step t+l−1, l=max($l_k$) for k=[1,K]" we can also compute the posterior probability (Eqs. 3.6 and 3.7) up to t+l−1, which is more resistant to noise.

| Algorithm 1 Learning process for SPAMS. |
| --- |
| Input: $\{z_i^1, z_i^2, \ldots, z_i^T\}N_{i=1}$: a set of multi-variate sequences. |
| $\{y1, \ldots, yN\}$: labels of sequences. $C(\cdot)$: context information. |
| 1: Initialize parameters |
| 2: while not converge && it++ ≤ MaxIter do |
| 3:    for i←1 to N do |
| 4:      // In practice we use mini-batch update. |
| 5:      for t←1 to T−w+1 do |
| 6:        Compute latent output $p_i^t$ by Eqs. 3.4 and 3.5. |
| 7:      end for |
| 8:      for k←1 to K do |
| 9:        Find $t_{i,(k)}^*$ based on computed $p_i^{t=1:T-w+1}$. |
| 10:     end for |
| 11:     Compute the predicted label $\hat{y}$ by Eqs. 3.6 and 3.7. |
| 12:     Update parameters by Eq. 3.9 and back-propagation. |
| 13:    end for |
| 14:    for k←1 to K do |
| 15:     Update $l_k$ based on latent outputs. |
| 16:     Compute $\bar{p}_{(k)}$ for M contexts using obtained $\{p_i\}N_{i=1}$. |
| 17:    end for |
| 18: end while |

4 Experiments

In this section, we present our evaluation of the proposed method on two real-world datasets. We first introduce the involved baseline methods:

Artificial Neural Networks (ANN):

An ANN applied to concatenated sequential data, which is a static baseline.

Random Forest (RF):

As another static baseline, RF is also applied on data concatenation. RF has been widely utilized for classifying remote sensing data.

Hidden Markov Support Vector Machine ($SVM^{hmm}$):

This baseline combines SVM and Hidden Markov Model (HMM) The features at each time step are utilized as input and the sequence label is copied to all the time steps. The prediction is based on majority voting from all the time steps.

Long-short Term Memory (LSTM):

Similar with $SVM^{hmm}$, the features at each time step are utilized and the sequence labels are copied to each time step when applying a traditional LSTM.

Sequence to Vector (S2V):

This baseline is originally designed for EEG recognition. A sliding window is utilized to capture several frequent patterns, then the sequential data are translated into a vectorized representation using word2vec technique. Finally an SVM classifier is applied on the obtained representation.

LSTM Many to One ($LSTM^{ml}$):

We utilize the sliding window and the LSTM structure as described in SPAMS. However, instead of using multi-instance learning approach, this baseline directly utilize the many-to-one LSTM output structure, where we set the sequence label to be the label of the last time window.

Recurrent Neural Networks variant ($SPAMS^{rnn}$):

In this baseline, we replace the LSTM structure in SPAMS with traditional Recurrent Neural Networks (RNN).

No Context Variant ($SPAMS^{nc}$):

This baseline is a variant of SPAMS without using context information.

4.1 Cropland Mapping

In this experiment, we implement the present embodiments, referred to as SPAMS, to distinguish between corn and soybean in Minnesota, US. To populate the input sequential features, we utilize MODIS multi-spectral data, collected by MODIS instruments onboard NASA's satellites. MODIS data are available for every 8 days and have 46 time steps in a year. At each time step, MODIS dataset provides reflectance values on 7 spectral bands for every location. In this test, we took 5,000 locations in Minnesota State for each of corn class and soybean class in 2014 and 2016. The ground-truth information on these two classes is provided by USDA crop layer product [USDA national agricultural statistics service cropland data layer. https://nassgeodata.gmu.edu/CropScape/. Accessed: 2017 Sep. 25]. This task is challenging in agricultural research mainly for two reasons: 1) the satellite data for corn and soybean are similar to each other on most dates of a year, 2) each MODIS location is in 500 m spatial resolution and may contain multiple crop patches, likely introducing noisy features, and 3) the remote sensing data are likely to be disturbed by natural variables (clouds, smoke, etc.) and other noise factors.

We randomly select 40% locations from east Redwood, Minn. and utilize their sequential features in 2016 as training data, and took another 10% as validation set. Then we conducted three groups of tests: 1) We tested on the subset of remaining locations in 2016 which are in the same region with training data (R1). 2) We tested on the subset of remaining samples in 2016 that are located in different regions with training data (R2). 3) We conducted a cross-year test on the data acquired from 2014 using the learned models from 2016. It is note-worthy that the planting time differs between these two years because of the weather conditions in Minnesota. In this test, we set w=5, which is sufficiently long to cover an informative period in crop growing process. The selected $l_k$ values are 4 and 5 for corn and soybean classes, respectively. The context information is provided based on geo-spatial separation.

We repeated the experiment with random initialization and random selection of training set (from the same region). The average performance of each test is shown in Table 1. It can be observed that both static methods (ANN and RF) and sequential methods on time step level ($SVM^{hmm}$ and LSTM) give unsatisfactory performance. By comparing $SPAMS^{rnn}$ and SPAMS, we conclude that long-term dependencies are important for extracting patterns from yearly multispectral sequence. S2V does not perform as well as SPAMS since many frequent patterns are noisy fluctuations or common patterns for both classes, and thus do not contain enough discriminative power. The improvement from $LSTM^{ml}$ and $SPAMS^{nc}$ to SPAMS shows that both multi-instance learning and context information are helpful for the classification.

Table 1 also shows a decrease of Area Under Curve (AUC) and F1-score for the cross-year performance compared to the performance in 2016. This is mainly due to two reasons. First, the planting time of 2014 is in ahead of 2016, and thus a successful classification requires the method to automatically detect such shifting patterns. Second, the collected multi-spectral features vary across years due to environmental variables, such as precipitation, sunlight, etc. Nevertheless, it can be seen that SPAMS still produces a reasonable cross-year detection, which stems from its capacity in capturing shifting patterns.

TABLE 1

Performance (±standard deviation) of each method in cropland mapping using AUC and F-1 score.

| Method | R1 AUC | R1 F1 | R2 AUC | R2 F1 | Cross-year AUC | Cross-year F1 |
|---|---|---|---|---|---|---|
| ANN | 0.717(±0.018) | 0.711(±0.011) | 0.715(±0.018) | 0.704(±0.012) | 0.660(±0.021) | 0.678(±0.015) |
| RF | 0.746(±0.013) | 0.733(±0.010) | 0.744(±0.013) | 0.734(±0.012) | 0.655(±0.014) | 0.678(±0.012) |
| SVM$^{hmm}$ | 0.753(±0.015) | 0.737(±0.011) | 0.746(±0.016) | 0.733(±0.011) | 0.721(±0.015) | 0.697(±0.013) |
| LSTM | 0.759(±0.019) | 0.737(±0.011) | 0.748(±0.020) | 0.722(±0.010) | 0.710(±0.020) | 0.693(±0.014) |
| S2V | 0.789(±0.038) | 0.758(±0.018) | 0.787(±0.040) | 0.753(±0.018) | 0.746(±0.038) | 0.712(±0.020) |
| LSTM$^{ml}$ | 0.804(±0.019) | 0.766(±0.009) | 0.791(±0.021) | 0.753(±0.011) | 0.760(±0.019) | 0.701(±0.010) |
| SPAMS$^{rnn}$ | 0.779(±0.045) | 0.759(±0.016) | 0.769(±0.046) | 0.758(±0.017) | 0.725(±0.040) | 0.717(±0.016) |
| SPAMS$^{nc}$ | 0.831(±0.025) | 0.786(±0.013) | 0.827(±0.024) | 0.786(±0.014) | 0.789(±0.026) | 0.738(±0.014) |
| SPAMS | 0.887(±0.024) | 0.823(±0.012) | 0.873(±0.020) | 0.818(±0.012) | 0.822(±0.022) | 0.757(±0.014) |

Figure 5:
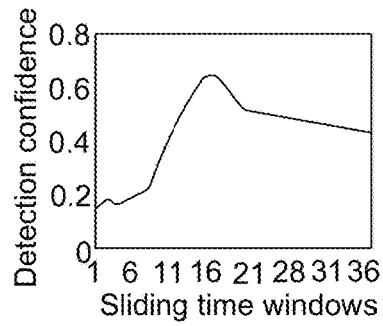
FIG. 5(a) is a graph of detection confidence on corn samples with delay of 0 time steps.
FIG. 5(b) is a graph of detection confidence on corn samples with delay of 8 time steps.
FIG. 5(c) is a graph of detection confidence on corn samples with delay of 16 time steps.
Figure 5:
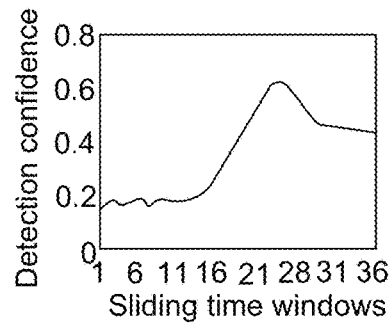
Figure 5:
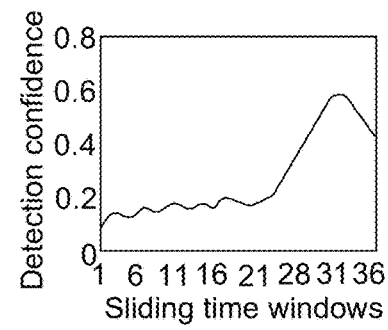

To explicitly show this capacity, we test SPAMS on a synthetic sequence set with shifting patterns. Specifically, we manipulate corn samples by delaying the growing season by 0, 8, and 16 time steps, respectively. In this way, we create three groups of corn samples for testing. We still use the learned SPAMS model from the original training set. In FIGS. 5(a), 5(b), and 5(c), we show the detection confidence (i.e. $p^t$ values) on these three groups of test data with FIG. 5(a) showing the detected confidence over time for 0 delay, FIG. 5(b) showing the detected confidence over time for the 8 time steps delay and FIG. 5(c) showing the detected covidence over timer for the 16 time step delay. It can be clearly seen that SPAMS is capable of locating the most discriminative periods for each group.

Figure 6:
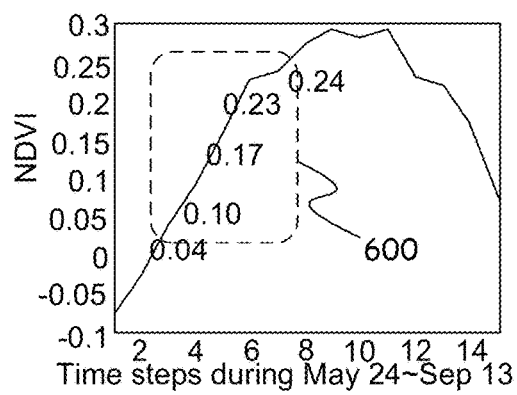
FIG. 6(a) is a graph of an average Normalized Difference Vegetation Index (NDVI) series for corn during May 24~September 13. The larger NDVI value indicates higher greenness level. The part in the dotted box corresponds to the period June 9~July 11.
FIG. 6(b) is a graph of an average NDVI series for soybean during May 24~September 13. The larger NDVI value indicates higher greenness level. The part in the dotted box corresponds to the period June 9~July 11.
Figure 6:
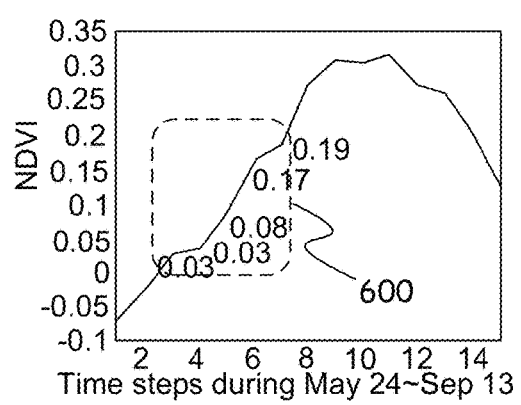
Figures 7A, 7B, 7C, 7D, 7E:
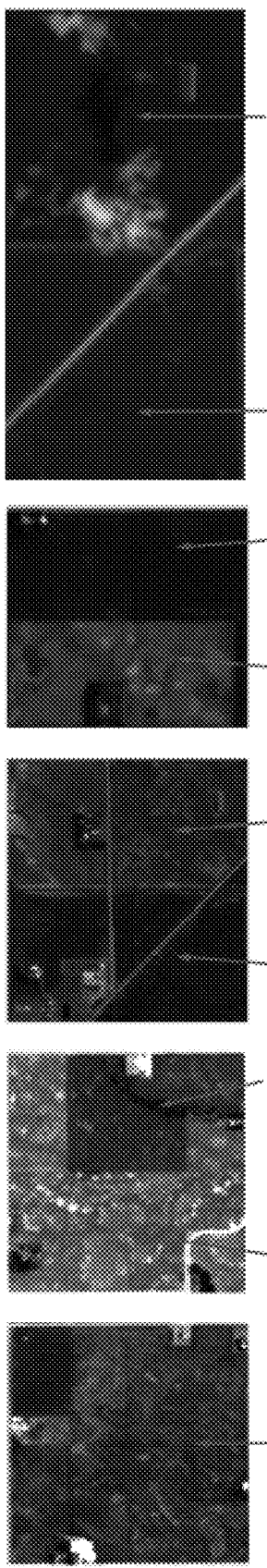
FIGS. 7(a)-(d) are Sentinel-2 satellite images of cropland patches with corn and soybean on Jun. 23, 2016.
FIG. 7(e) is a Sentinel-2 satellite image of a cropland patch taken on Aug. 6, 2016.

To verify that SPAMS indeed detects the discriminative information in multi-variate sequence, we check the obtained top-2 most informative periods in 2016. The first detected informative period is from June 9 to July 11, displayed as the blocked part 600 in FIGS. 6(a) and 6(b), which show greenness levels for corn and soybeans, respectively, over time. FIGS. 6(a) and 6(b) show that during the detected period, corn became much greener than soybeans making period 600 an effective period for distinguishing corn from soybeans. FIGS. 7 (a)-(d) show some corn and soybean patches in four example regions using high-resolution Sentinel-2 images on June 23, which confirm that corn patches show a higher greenness level than nearby soybean patches. When applying the learned model to 2014, we can detect the period May 25 to June 26 as an informative period, which conforms the fact that the planting in 2014 starts earlier than 2016.

The second detected informative period in 2016 is from July 19 to August 20. During this period, both corn and soybean samples show very high greenness level and therefore it is difficult to distinguish between them from either Normalized Difference Vegetation Index (NDVI) series or high-resolution RGB images (e.g. the August 06 Sentinel-2 image shown in FIG. 7(e)). Here to verify that this period is indeed an informative period using multi-spectral features, we only use the multi-spectral features from July 19 to August 20 to train and test a simple ANN model, which produces AUC and F1-score of 0.829 and 0.778, respectively. It is noteworthy that the ANN baseline using the entire sequence only leads to a performance of 0.717 (AUC) and 0.711(F-1 score) according to Table 1. This improvement demonstrates that SPAMS is able to detect the informative or discriminative period of full multi-spectrum, which cannot be easily observed by human experts.

Figure 8A:
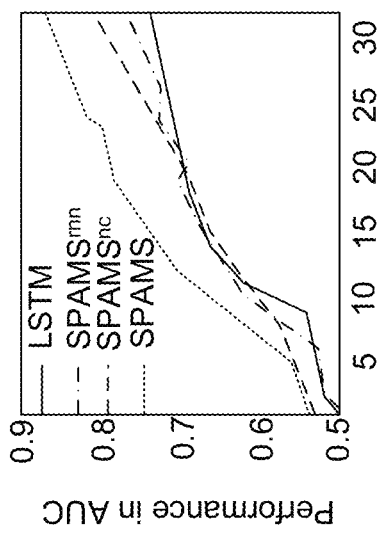
FIG. 8(a) is a graph of an early-stage prediction performance in crop mapping using sequential data by the end of sliding time window.

Finally, we evaluate the performance of SPAMS in early stage prediction. In FIG. 8(a), we show the performance of LSTM, SPAMS$^{rnn}$, SPAMS$^{nc}$ and SPAMS given only the sequential data by the end of sliding time windows. We can observe that SPAMS quickly attains higher AUC than other baseline methods shortly after the start of growing season.

4.2 Affective State Recognition

Besides the cropland classification, we validate the proposed method in affective state recognition using collected electroencephalogram (EEG) data. Specifically, we conduct experiment on DEAP EEG dataset [S. Koelstra, C. Muhl, M. Soleymani, J.-S. Lee, A. Yazdani, T. Ebrahimi, T. Pun, A. Nijholt, and I. Patras. Deap: A database for emotion analysis; using physiological signals. TAC, 2012], where 40-channel EEG data are recorded for 32 participants. Every participant is asked to watch 40 online one-minute videos during EEG collection. We aim to utilize the EEG recordings to classify whether a participant likes a video or not. Before we test each method, we first preprocess the EEG data by down-sampling and standardization.

The main challenge in this task is the lack of a large volume of training samples. Many existing methods can easily lead to overfitting in this task. We set the length of sliding window to be is to cover neural activities, and set the step size of sliding window as 0.25 s. The selected $l_k$ values are 8 and 12 for positive (likes the video) and negative (does not like the video) classes, respectively. In our implementation, we utilize the provided experiment settings information as context information. If a set of EEG sequences are recorded when the involved participants are watching the same video, these sequences should belong to the same context.

We partition the data using 40% as training data, 10% as validation set, and 50% as test set. In Table 2, we show the performance of each method. We can observe that static methods perform poorly because of overfitting. Moreover, compared to SVM$^{hmm}$ and LSTM, the methods that utilize time windows achieve a better performance. This stems from the fact that affective states are reflected by temporal patterns rather than by any single time step. Furthermore, the comparison between SPAMS$^{nc}$ and SPAMS confirms that context information is helpful in locating discriminative time windows and improving classification performance. In general, the prediction accuracy is not as high as cropland mapping task, which is mainly because the participants behave quite differently with each other and we are not provided with sufficient training data.

TABLE 2

Performance (±standard deviation) of each method
in affective state recognition

| Method | AUC ± std | F1 ± std |
| --- | --- | --- |
| ANN | 0.555 (±0.021) | 0.624 (±0.013) |
| RF | 0.509 (±0.017) | 0.620 (±0.014) |
| SVM$^{hmm}$ | 0.569 (±0.010) | 0.643 (±0.007) |
| LSTM | 0.560 (±0.020) | 0.654 (±0.012) |
| S2V | 0.705 (±0.036) | 0.714 (±0.017) |
| LSTM$^{ml}$ | 0.709 (±0.018) | 0.711 (±0.012) |
| SPAMS$^{mn}$ | 0.646 (±0.046) | 0.712 (±0.019) |
| SPAMS$^{nc}$ | 0.733 (±0.021) | 0.722 (±0.016) |
| SPAMS | 0.759 (±0.020) | 0.746 (±0.015) |

Figure 8B:
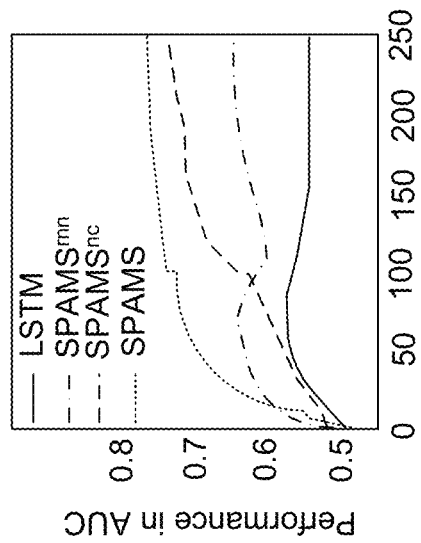
FIG. 8(b) is a graph of an early-stage prediction performance in affective state recognition using sequential data by the end of sliding time window.

In FIG. 8 (b), we show the prediction performance using EEG data by the end of sliding time window. We can observe that SPAMS quickly approaches AUC 0.7 at around 60th time window (~15 s in one-minute video).

Then we apply the learned model to EEG recordings and validate the detected most discriminative time periods for each recording. For this validation, we utilize the provided frontal facial videos for the first 22 participants provided by DEAP dataset. For example, if the detected most discriminative time period for "like" class is around t seconds, and we observe a smile at the same time. Then we confirm that this detection is correct.

Since it is time-consuming to check each individual trial, in this test we compute the discriminative time period for each video using the average temporal profile.

Then for each video, we manually checked how many participants out of all participants have a relevant facial expression around the detected discriminative time period (allowing a delay of 2 s). The relevant facial expressions include movement of lips, eyebrow, nose, eyes, etc. In Table 3, we report results for only the first 5 videos due to space limitations. According to our study on all 40 videos, the average fraction values for "like" and "dislike" are 0.569 and 0.495. Since most participants show very few facial expressions during entire process of EEG recording, these fraction values can clearly confirm that SPAMS detects the discriminative time steps that are relevant to the classification.

TABEL 3

The validation of informative periods (for the first 5 test videos) using synchronized facial videos.

| Video | Label | Time (s) | Rel-expr/partic |
| --- | --- | --- | --- |
| 1 | like | 19 | 7/11 |
|   | not like | 44 | 5/11 |
| 2 | Like | 39 | 6/10 |
|   | not like | 14 | 6/12 |
| 3 | Like | 11 | 5/9 |
|   | not like | 41 | 6/12 |
| 4 | like | 23 | 6/13 |
|   | not like | 6 | 5/9 |
| 5 | like | 2 | 5/9 |
|   | not like | 56 | 6/12 |

Figure 9:
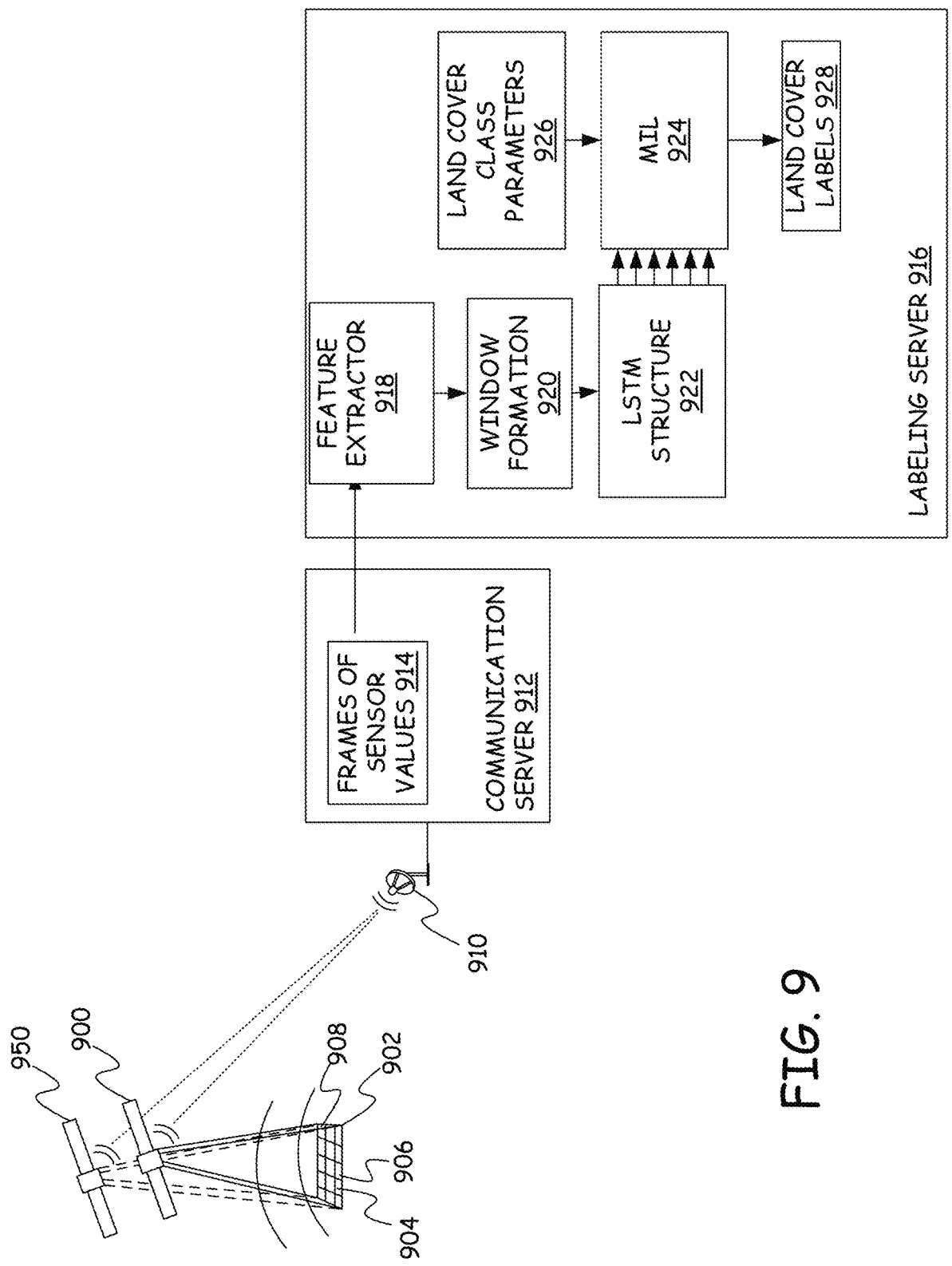
FIG. 9 is a block diagram of a system for land cover prediction in accordance with one embodiment.

FIG. 9 provides a system diagram of a system used to improve the efficiency and accuracy of computer-based labeling technology that automatically labels satellite data to determine land covers. In FIG. 9, a satellite 900, positioned in orbit above the earth and having one or more sensors, senses values for a geographic location 902 that is comprised of a plurality of geographic areas/smaller geographic locations 904, 906 and 908. Multiple sensors may be present in satellite 900 such that multiple sensor values are generated for each geographic area of geographic location 902. In addition, satellite 900 collects frames of sensor values for geographic location 902 with each frame being associated with a different point in time. Thus, at each point in time, one or more sensor values are determined for each geographic area/smaller geographic location in geographic location 902 creating a time series of sensor values for each geographic area/smaller geographic location. Satellite 900 transmits the sensor values to a receiving dish 910, which provides the sensor values to a communication server 912. Communication server 912 stores the sensor values as frames of sensor values 914 in a memory in communication server 912. A labeling server 916 receives frames of sensor values 914 and provides the received frames of sensor values to a feature extractor 918, which extracts multi-variate features from the sensor values. The multi-variate features are provided to a window formation unit 920, which groups the features from different time points into sequences of windows. Each window of time points is provided to LSTM structure 922, which produces a discrimination confidence value for each of a set of land cover classes for each window in the sequence of windows. The confidence values across a large set of time points T are then used by Multi-Instance Learning (MIL) module 924 to predict a land cover label 928, such as Forest, Urban, Burned, Plantation, Unburned, Corn, Soybean and Water, for example, for each smaller geographical location in the image data. In accordance with one embodiment, MIL module 924 uses land cover class parameters 926 such as the number of consecutive confidence values $l_k$ to use in equation 3.6 for each land cover class to determine the probability of the land cover class.

Figure 10:
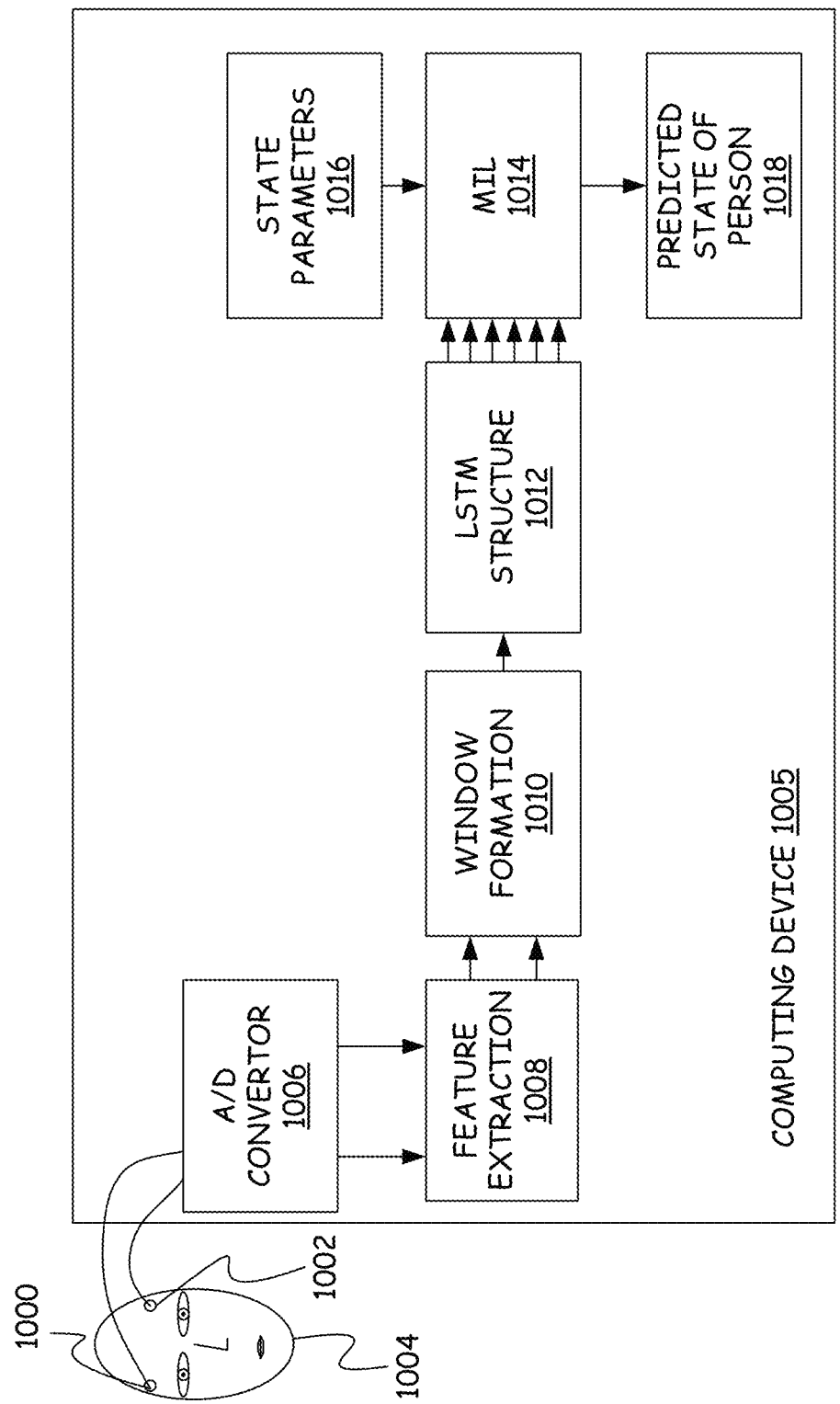
FIG. 10 is a block diagram of a system for predicting a state of a person in accordance with one embodiment.

FIG. 10 provides a system diagram of a system used to improve the efficiency and accuracy of a computer-based technology that automatically determines the state of a person based on electrical signals generated by the person. In FIG. 10, electrical leads 1000 and 1002 are applied to a person 1004 and generate analog electrical signals that are provided to a computing device 1005. An analog-to-digital convertor 1006 converts the analog signals from each electrical lead into a series of digital values that are provided to a feature extractor 1008. For each of a set of time points, feature extractor 1008 generates multi-variate features. The features at each time point are provided to a window formation unit 1010, which groups the features from different time points into sequences of windows. Each window of time points is provided to LSTM structure 1012, which produces a discrimination confidence value for each state that a person can be in for each window in the sequence of windows. The states of the person can include affective states such as interest or emotional states, or medical states such as non-seizure, pre-seizure, seizure, and post-seizure, for example. The confidence values across a large set of time points T are then used by Multi-Instance Learning (MIL) module 1014 to predict a state of the person 1018. In accordance with one embodiment, MIL module 1014 uses state parameters 1016 such as the number of consecutive confidence values $l_k$ to use in equation 3.6 for each state to determine the probability of the state.

Figure 11:
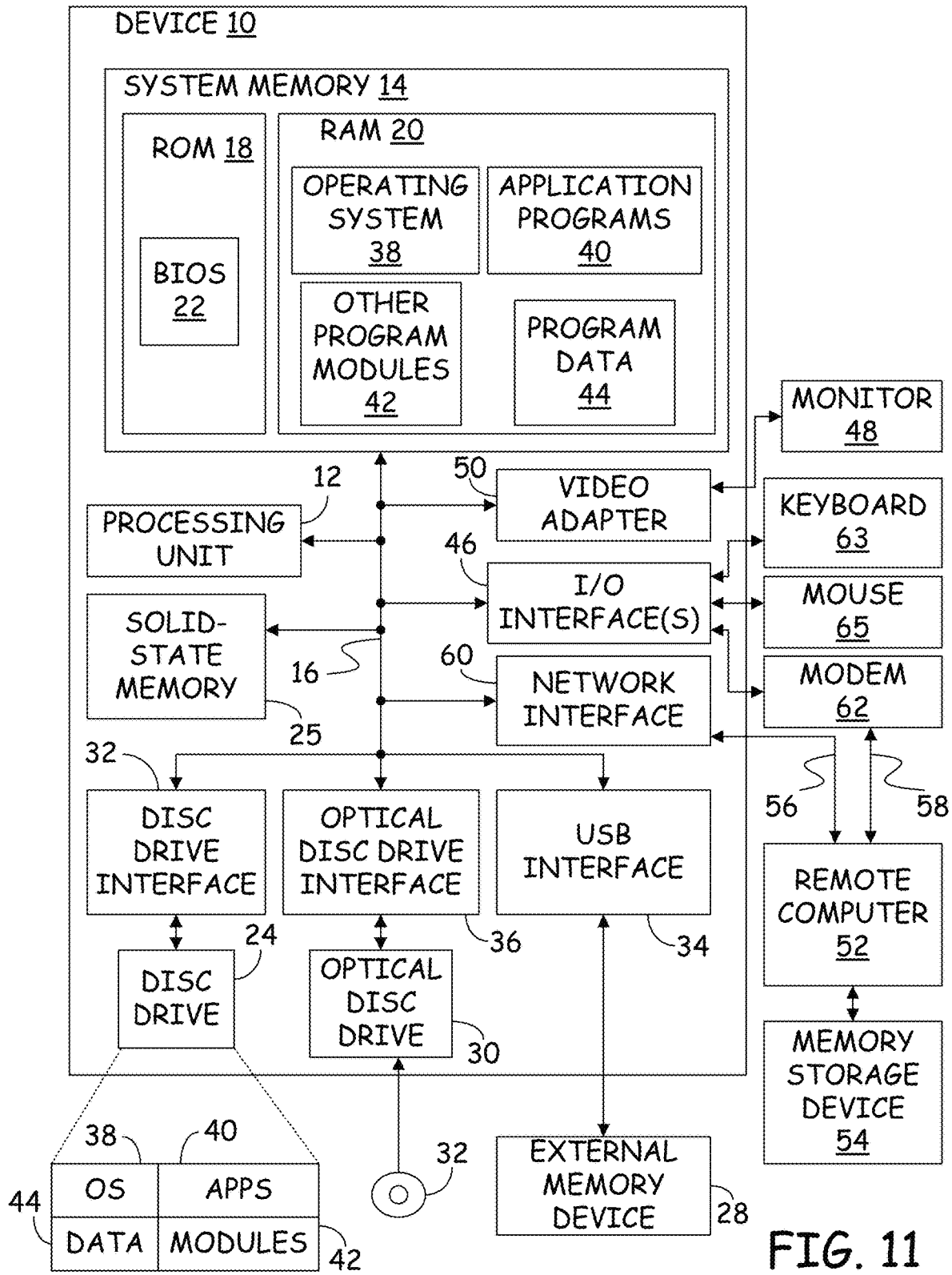
FIG. 11 is a block diagram of a computing device used in the various embodiments.

An example of a computing device 10 that can be used as a server and/or client device in the various embodiments is shown in the block diagram of FIG. 11. For example, computing device 10 may be used to perform any of the steps described above. Computing device 10 of FIG. 11 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 11. The network connections depicted in FIG. 11 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 11 are exemplary and other means for establishing a communications link between the computers, such as a wireless interface communications link, may be used.

6 Conclusions

The various embodiments provide a method for sequence classification by discovering the discriminative patterns within the sequence. The embodiments utilize a sliding window to capture the discriminative pattern and combine it with LSTM to incorporate temporal dependencies. Besides, an MIL structure is used to detect the discriminative period, which also provides real-world interpretation to prediction results in applications. According to experimental results, SPAMS outperforms multiple baselines in sequence classification. Besides, the successful detection of discriminative periods is extremely valuable for scientific domain research, which used to heavily rely on simple classification methods with hand-crafted temporal features from the entire sequence. In this way, SPAMS has potential to contribute to a large class of inter-disciplinary works between machine learning and scientific domain research.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

Although the present invention has been described with reference to preferred embodiments, workers skilled in the art will recognize that changes may be made in form and detail without departing from the spirit and scope of the invention.

What is claimed is:
1. A method comprising:
receiving satellite image data for a location for each of a plurality of time points;
for each of a plurality of time windows that each comprises a respective plurality of time points, determining a confidence value that indicates a degree to which the time window contains image data that is useful in discriminating between land cover types;
using the confidence values to determine a probability of a land cover type by determining an average confidence value for the land cover type for each of a plurality of sets of consecutive time windows to form a plurality of average confidence values for the land cover type and using the plurality of average confidence values to determine the probability of the land cover type; and using the probability of the land cover type to set a predicted land cover type for the location.

2. The method of claim 1 wherein determining a confidence value comprises determining a confidence value for each of a plurality of land cover types for each time window.

3. The method of claim 2 wherein using the confidence values to determine a probability of a land cover type comprises, for each land cover type in the plurality of land cover types:

determining an average confidence value for the land cover type for each of a plurality of sets of consecutive time windows;

using the largest average confidence value to determine the probability of the land cover type.

4. The method of claim 1 wherein determining a confidence value that the time window contains image data that is useful in discriminating between land cover types comprises using parameters that are trained based on a function that includes a difference between a confidence value for the location and an average confidence value of a cluster of locations.

5. The method of claim 1 wherein determining a confidence value that the time window contains image data that is useful in discriminating between land cover types comprises using a Long Short-Term Memory to model temporal patterns.

6. The method of claim 5 wherein the Long-Short Term Memory comprises a sequence of Long Short-Term memory cells, where each cell receives image data for each time point of a plurality of time points in a respective time window.

7. A method comprising:

receiving satellite image data for a location for each of a plurality of time points;

for each of a plurality of time windows that each comprises a respective plurality of time points, determining a confidence value that indicates a degree to which the time window contains image data that is useful in discriminating between land cover types wherein determining a confidence value comprises determining a confidence value for each of a plurality of land cover types for each time window;

using the confidence values to determine a probability of each land cover type though steps comprising:

determining an average confidence value for each land cover type for each of a plurality of sets of consecutive time windows, wherein each set of consecutive time windows comprises a number of consecutive windows, wherein the number of consecutive windows is separately selected for each land cover type such that two different land cover types use two different numbers of consecutive windows; and using the largest average confidence value for a respective land cover type to determine the probability of the respective land cover type; and using the probability of each land cover type to set a predicted land cover type for the location.

* * * * *